(12) United States Patent
Sandfort et al.

(10) Patent No.: US 11,032,258 B2
(45) Date of Patent: Jun. 8, 2021

(54) LOCAL COMPUTE RESOURCES AND ACCESS TERMS

(71) Applicant: Hewlett-Packard Development Company, L.P., Spring, TX (US)

(72) Inventors: Patrick O Sandfort, Vancouver, WA (US); Holt Mebane, San Diego, CA (US); Jun Zeng, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 173 days.

(21) Appl. No.: 15/764,314

(22) PCT Filed: Nov. 5, 2015

(86) PCT No.: PCT/US2015/059317
§ 371 (c)(1),
(2) Date: Mar. 28, 2018

(87) PCT Pub. No.: WO2017/078723
PCT Pub. Date: May 11, 2017

(65) Prior Publication Data
US 2018/0288130 A1 Oct. 4, 2018

(51) Int. Cl.
*G06F 15/173* (2006.01)
*H04L 29/06* (2006.01)
*H04W 4/80* (2018.01)
*H04L 29/08* (2006.01)
(Continued)

(52) U.S. Cl.
CPC ........ *H04L 63/0492* (2013.01); *H04L 63/102* (2013.01); *H04L 67/04* (2013.01); *H04L 67/10* (2013.01); *H04L 67/12* (2013.01); *H04L 67/16* (2013.01); *H04L 67/18* (2013.01); *H04L 67/322* (2013.01); *H04L 67/327* (2013.01);
(Continued)

(58) Field of Classification Search
CPC ... H04L 67/04; H04L 63/0492; H04L 63/102; H04L 67/10; H04L 67/12; H04L 67/16; H04L 67/18; H04L 67/322; H04L 67/327; H04W 4/80; H04W 12/08
USPC .......................... 709/226, 223, 224, 225, 229
See application file for complete search history.

(56) References Cited

U.S. PATENT DOCUMENTS

| 6,988,280 B2 | 1/2006 | Burnett | |
|---|---|---|---|
| 9,596,189 B1* | 3/2017 | Lea | ........................ G06F 16/214 |
| 2004/0073535 A1* | 4/2004 | Iwasaki | .............. G06Q 30/0633 |

(Continued)

OTHER PUBLICATIONS

"Sato Selects Logmein to Enable It's Next Generation of lot-connected Printers", Oct. 29, 2014.
(Continued)

*Primary Examiner* — Kaylee J Huang
(74) *Attorney, Agent, or Firm* — HP Inc. Patent Department (57) ABSTRACT

In one example, a resource system includes a local compute resource, an authorization engine to authorize a resource request to the local compute resource from a source, an interface engine to assign a data property to the local compute resource in response to a determination that the resource request is authorized to access the local compute resource, and a manager engine to assign access of the local compute resource to the resource request based on a comparison of the data property and an access term associated with an authorization level of the resource request.

20 Claims, 5 Drawing Sheets

(51) Int. Cl.
*H04W 12/082* (2021.01)
*H04W 12/084* (2021.01)

(52) U.S. Cl.
CPC ........... *H04W 4/80* (2018.02); *H04W 12/082* (2021.01); *H04W 12/084* (2021.01)

(56) References Cited

U.S. PATENT DOCUMENTS

| | | | | |
|---|---|---|---|---|
| 2005/0213519 | A1* | 9/2005 | Relan | G06F 21/43 |
| | | | | 370/277 |
| 2005/0237985 | A1* | 10/2005 | Stewart | H04L 12/14 |
| | | | | 370/338 |
| 2005/0283731 | A1* | 12/2005 | Saint-Hilaire | H04L 12/2803 |
| | | | | 715/733 |
| 2006/0106917 | A1* | 5/2006 | Lambourn | G06F 21/6218 |
| | | | | 709/217 |
| 2007/0213879 | A1* | 9/2007 | Iwamura | H04B 3/54 |
| | | | | 700/292 |
| 2010/0263025 | A1* | 10/2010 | Neitzel | H04L 63/105 |
| | | | | 726/4 |
| 2012/0005376 | A1 | 1/2012 | Meghdies Vardeh et al. | |
| 2013/0066908 | A1* | 3/2013 | Niranjan | H04W 12/08 |
| | | | | 707/770 |
| 2014/0040916 | A1* | 2/2014 | Balakrishnan | G06F 9/542 |
| | | | | 719/313 |
| 2014/0244001 | A1 | 8/2014 | Glickfield et al. | |
| 2014/0244017 | A1 | 8/2014 | Freiwirth et al. | |
| 2014/0245394 | A1 | 8/2014 | Abuelsaad et al. | |
| 2014/0324973 | A1* | 10/2014 | Goel | H04W 4/70 |
| | | | | 709/204 |
| 2015/0007273 | A1 | 1/2015 | Lin | |
| 2015/0019436 | A1* | 1/2015 | Dalal | G06Q 20/042 |
| | | | | 705/45 |
| 2015/0033292 | A1* | 1/2015 | Nguyen | H04L 63/08 |
| | | | | 726/4 |
| 2015/0052105 | A1* | 2/2015 | Nguyen | G06F 16/178 |
| | | | | 707/626 |
| 2015/0067881 | A1* | 3/2015 | Badstieber | G06F 21/6254 |
| | | | | 726/26 |
| 2015/0161257 | A1* | 6/2015 | Shivaswamy | G06F 16/951 |
| | | | | 707/709 |
| 2015/0281119 | A1* | 10/2015 | Olkha | H04L 63/10 |
| | | | | 709/225 |
| 2016/0357514 | A1* | 12/2016 | Riggs-Zeigen | G06F 16/60 |
| 2017/0006106 | A1* | 1/2017 | Shepherd | H04L 67/12 |

OTHER PUBLICATIONS

"Xerox CentreWare Web", Dec. 9, 2014.
Lawson, S. "AllJoyn IoT Platform Reaches out to the Internet for Remote Control", Jan. 6, 2015.
Webb, M. "Berg V2 Beta: New Cloud API and New Device API", Sep. 9, 2014.

* cited by examiner

LOCAL COMPUTE RESOURCES AND ACCESS TERMS

BACKGROUND

Compute devices may collect and store information as well as communicate information to other compute devices. Compute devices have resources to perform operations on information and provide results, such as by communicating the results to a connected device.

DETAILED DESCRIPTION

In the following description and figures, some example implementations of apparatus, systems, and/or methods for providing access to local compute resources are described. Devices are becoming increasingly connected. The "Internet of Things" (IoT) allows cloud-based services to interact with devices in various locations and with various capabilities. IoT devices may be minimalistic in nature, with processing, storage, and networking capabilities at a restrictive capacity to enable smaller form factors, increase mobility, and/or reduce power consumption and/or cost. If capabilities of devices were combinable and/or shareable across different devices, greater capabilities may be provided to a device for the both the consumer and developer. The description herein describes architecture and operations to allow an IoT device to access capabilities from a nearby, local host device, to, for example, increase the capabilities of the IoT device.

Various examples described below relate to enable services to utilize compute resources of devices local to the IoT device. For example, a home printer may offer processing and storage capabilities to a smart watch or security camera. A system may host compute resources (such as processing, storage, and network resources) to IoT devices and sensors, and thus, allow the devices to be compact with less resources on the device. Furthermore, computing abilities of the IoT device may, for example, improve performance of the devices and/or provided computing functionality beyond what the IoT device could do on its own. For example, a wrist wearable IoT device that tracks exercise may provide data to a data pool and allow a thermostat to access that data from the pool to set an environment (e.g., a room) to a cooler temperature when the wrist wearable IoT device enters the environment.

As discussed further herein, the resource system described enables management of IoT devices and access to local compute resources. The resources, for example, may be provided to IoT devices based on agreements for use (e.g., lease local computing resources) and access to the resources may be restricted based on the access terms of the agreements as well as proximity to the device hosting the local compute resources.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus. Furthermore, the term "maintain" (and variations thereof) as used herein means "to create, delete, add, remove, access, acquire, update, and/or modify."

Figure 1:
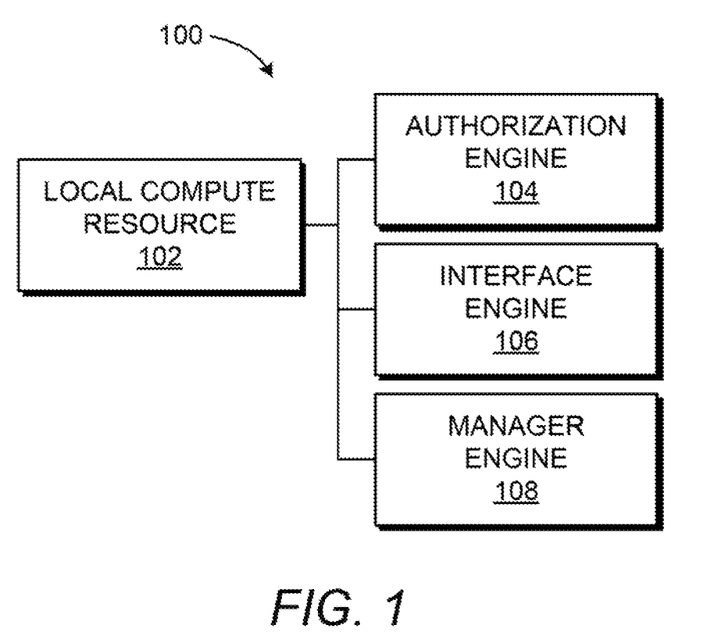
FIGS. 1 and 2 are block diagrams depicting example resource systems.
Figure 2:
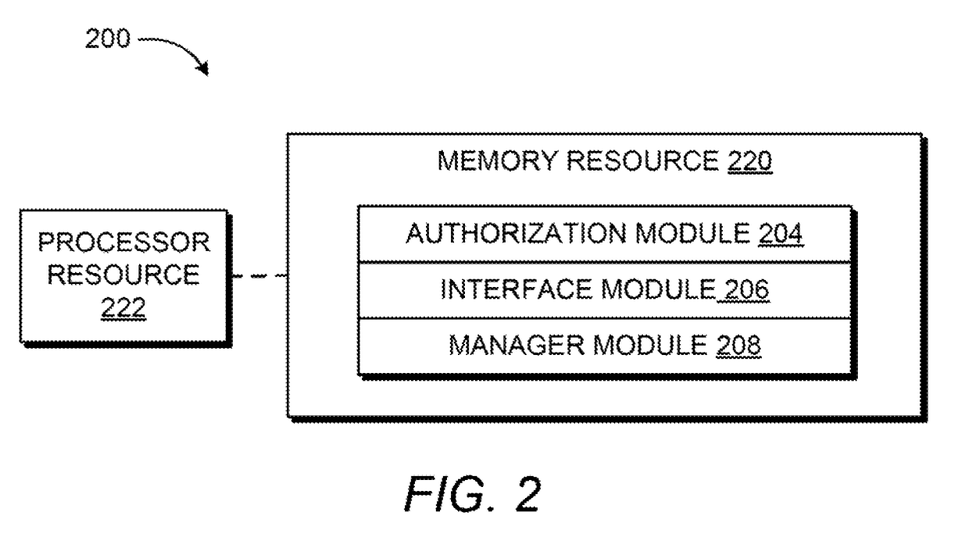

FIGS. 1 and 2 are block diagrams depicting example resource systems 100 and 200. Referring to FIG. 1, the example resource system 100 of FIG. 1 generally includes a local compute resource 102, an authorization engine 104, an interface engine 106, and a manager engine 108. In general, the manager engine 108 may provide access to local compute resource 102 based on authorization from the authorization engine 104 and the access request identified by the interface engine 106. For example, the engines 104-108 may be part of a wireless router that manages access to local compute resources by authorizing and providing access to devices connected to the wireless router.

A local compute resource, such as local compute resources 102, represents any allocateable resource usable to assist performance of an operation and is within a proximity threshold of a compute device (e.g., local). The proximity threshold may define a boundary for a local environment. As used herein, a local environment is the environment where the host device is located and/or network topology associated with the host device, and a host device, as used herein, refers to a compute device providing the local compute resource. The proximity threshold may be within a particular compute device, (such as a host device), within a distance from a particular compute device, or within a boundary defined with reference to a particular compute device, such as a building housing a wireless access point or within a network boundary of a network coupled to a network security device. Example proximity thresholds include a number of feet from a compute device, within transmittable range of an antenna from a compute device, within a house, within an office building, within an area distinguishable by a floor plan, and within the same logical computing network.

Example compute resources that are usable to assist performance of an operation include processor resources, memory resources, networking resources, power resources, input output (IO) resources, authentication resources, and virtual resources. Example processor resources include allocation of time to a central processing unit (CPU) or dedicating access of the CPU to a particular session of requests. Example memory resources include storage devices (such as persistent storage device including disk drive or flash memory), allocation of a portion of a computer-readable medium to a device, allocation of time to utilize a computer-readable medium, and allocation of a particular amount of storage size to a session of requests. Example networking resources including allocating bandwidth, use of a network interface device, or other allocation of a connection to a session of requests. Example power resource include allocating a power unit to charge a device, which may include allocating an amount of time and/or an amount of charge to be provided to a device. Example IO resources include allocation of an IO device (such as a memory card reader, a graphical control panel, and the like), allocation of a functionality of an IO device to a session of requests, allocation of an interface or port (such as a USB interface or a display port providing audio-visual output), and allocation of data of an IO device (such as scan data from a multi-function printer scan device or printed output produced by print job data). Example authentication resources include allocation of a device that performs security operations and/or analysis (such as a fingerprint reader) and allocation of time or a result of using a functionality of a security device (such as time interval for using a report provided by a biometric sensor). Example virtual resources include allocation of data (such as access logs or historical sensor logs of a device), allocations of data structures (such as databases or nodes of databases), application functionalities, and/or any virtual instantiations of the above mentioned compute resources to a session of requests.

The authorization engine 104 represents any circuitry or combination of circuitry and executable instructions to authorize a resource request to the local compute resource from a source. As used herein, a resource request is a communication proposing to maintain a local compute resource. Example resource requests include access requests to access a compute resource, partition requests to divide and/or apportion a compute resource, allocation requests that assign a compute resource, deallocation requests to remove assignments of a compute resource, and modification requests to modify the association of the request resource. For example, a resource request may be a request to access a storage location to store data (e.g., a data store request) and/or to retrieve data (e.g., a data query request). For another example, a resource request may be a request to allocate time on a CPU. For yet another example, a resource request may be a network access request to allocate use of a network interface device and/or a network connection to a device (e.g., a personal area network connection to the host device to bridge the local area network connection of the host device).

As used herein, a source represents an application or a device that generates the resource request. For example, a mobile phone application or a printer control panel may be activated by a user to request access to a local compute resource. For another example, a source may be an IoT sensor that provides data at certain time intervals or when particular conditions (e.g., thresholds) are satisfied, such as a motion detection device. A destination, as used herein, represents an application or a device that receives the result of the resource request.

The interface engine 106 represents any circuitry or combination of circuitry and executable instructions to assign a data property to a resource request in response to a determination that a source is authorized to access a local compute resource. For example, the interface engine 106 may be a combination of circuitry and executable instructions that when executed by the circuitry cause the circuitry to identify data to be stored at the local compute resource, and assign a data property to the data and/or the portion of the local compute resource containing the data in response to a determination that the resource request (e.g., the source of the resource request) is authorized to access the local compute resource.

The interface engine 106 may represent circuitry or a combination of circuitry to facilitate access to the local compute resource. Example operations to facilitate access to the local compute resource include publishing resources (such as storage sizes, processor utilizations, services, and functionalities) and providing interfaces to access the resource in a manner associated with the authorization level identified by the authorization engine 104. For example, the interface engine 106 may publish (e.g., broadcast) a list of local compute resources to devices within a range of the system, such as a proximity threshold discussed herein. For another example, the interface engine 106 may provide the virtual infrastructure to a source to perform a resource request with the host device to access a local compute resource. For yet another example, the interface engine 106 may publish a data type compatible with (e.g., offerable from or maintainable by) a local compute resource 102, such as broadcast a list of data types compatible with a local compute resource to a non-integrated IoT device provider.

For example, the interface engine 106 may identify data to be stored at the local compute resource, assign the data of the local compute resource for remote access in response to a determination that the data is publishable based on a user preference and may publish a portion of the data to a remote compute resource. In that example, the portion of the data is identified based on a data property and the user preference.

For another example, the interface engine 106 may provide an interface to provide bridge capabilities of a first device to a second device and may broadcast the bridge capabilities and the local compute resource to devices within a proximity range of the system as a platform as a service (PAAS) infrastructure. In that example, the interface may be provided by the interface engine 106 based on an authorization level of the destination being sent the interface information. An authorization level, as used herein, represents a degree of permissions to perform operations associated with the local compute resource. For example, a first degree of permission may allow a source to access data on a local compute storage resource, a second degree of permission may allow a source to create and delete data on a local computer storage resource, a third degree of permission may allow a source to access anonymized data, and a fourth degree of permission may deny any attempt to access data on the local compute resource. Permissions may be represented by levels, degrees, categories, or other identifiers that represent bounds of a policy, such as a security policy or a management policy. Policies may be based on various attributes of use of the local resource, such as time, utilization, percentage, or otherwise defined by access terms in an agreement between a source and the system 100.

The manager engine 108 represents any circuitry or combination of circuitry and executable instructions to assign access of the local compute resource to the resource request based on a comparison of the local compute resource and an access term associated with an authorization level of the resource request. For example, the manager engine 108 may be a combination of circuitry and executable instructions that when executed by the circuitry cause the circuitry to identify the local compute resource based on a resource request, determine an authorization level of a resource request, and allocate the local compute resource to the resource request based on an access term and the data property of the local compute resource.

As used herein, a data property represents a classification representable by an identifier, such as a value, a number, a character, a string, a label, etc. Example data properties assignable to local compute resources and/or data associated with local compute resources include a security property and/or a management property. As used herein, a security property represents an attribute identifiable with a local compute resource that represents a security condition. For example, a security property may specify the class of devices allowed to access the local compute resource (e.g., access data on a local compute resource that is categorized by the security property) and/or a class of requests allowed to access to the local compute resource. As used herein, a management property represents an attribute identifiable with a local compute resource that represents a management condition. For example, a management property may define classes of data, specify the class of data associated with a sensor, specify the class of data associated with an operation performable on a set of data, and/or other organizational classification of data and/or local compute resource.

The manager engine 108 may represent circuitry or a combination of circuitry to modify allocations of local compute resources. For example, the manager engine 108 may be a combination of circuitry and executable instructions that when executed cause the circuitry to monitor access to the local compute resource and prioritize demand of the local compute resources based on the access term for each resource request associated with the local compute resource. Prioritization may be based on a level of demand as well as terms for access of each request. For example, the manager engine 108 may prioritize access requests to a local compute resource based on a demand level identified by monitored access requests and access terms associated with the monitored access requests. For another example, prioritization could be based on payment type (such as pricing classes or auction) or source type (e.g., the class of the source could be preferred or basic).

The manager engine 108 may manage the local compute resource based on access terms. As used herein, access terms represent conditions and limitations for use as set by an agreement between the compute device (e.g., host device) and the source. For example, the manager engine 108 may establish access terms to a local compute resource for an IoT device and establish a resource stack of a platform as a service (PAAS) infrastructure model based on the access terms. The manager engine 108 may facilitate data provisioning based on the level of authorization and/or the access terms. For example, the manager engine 108 may maintain raw sensor data of the IoT device on the local compute resource in accordance with the access terms and send anonymized sensor data to a remote memory location (such as a cloud-based service) in accordance with the access terms. In another example, the manager engine 108 may maintain raw sensor data from multiple sensors and may send anonymized sensor data to a cloud-based storage location.

Figure 3:
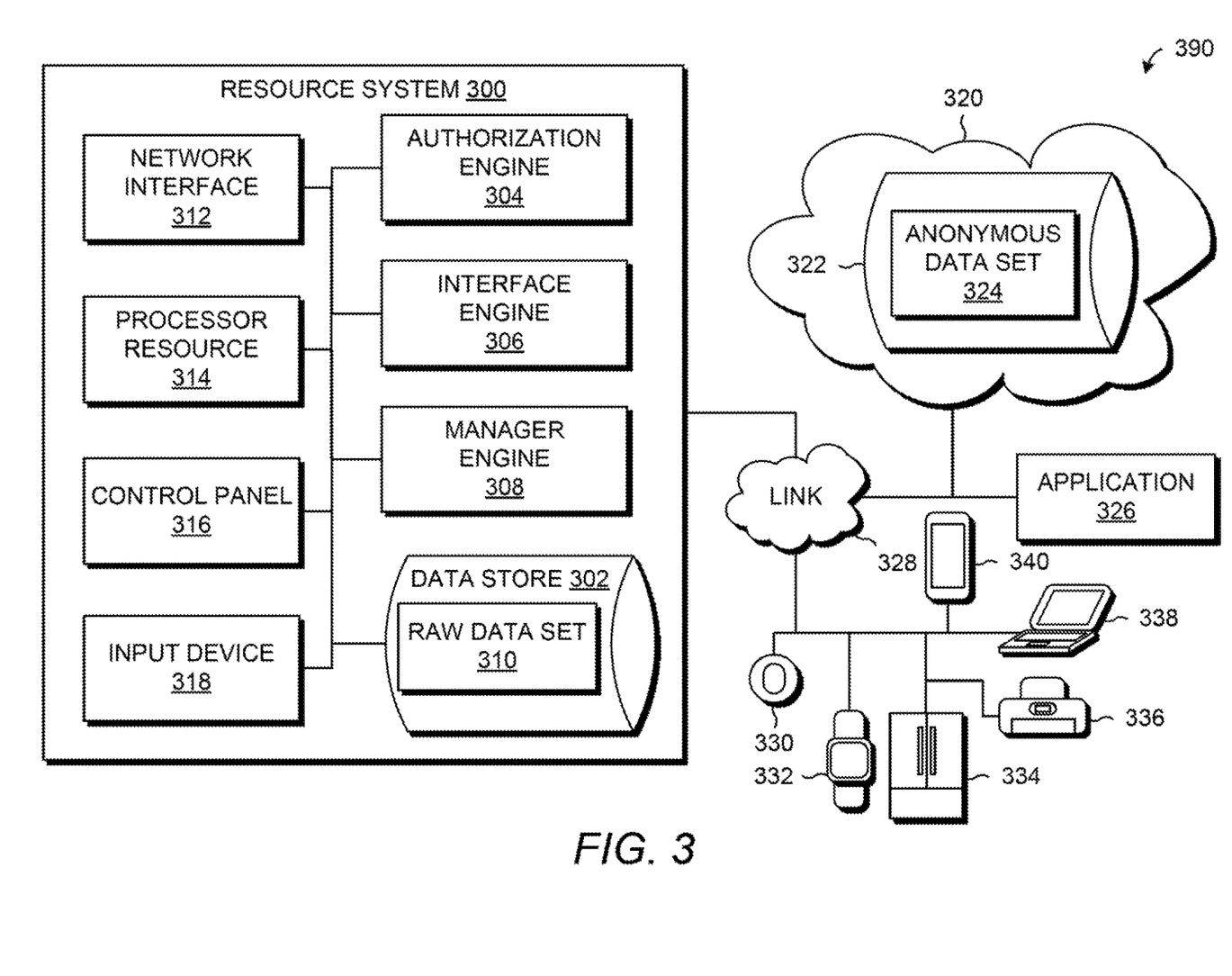
FIG. 3 depicts an example environment in which various resource systems may be implemented.
Figure 4:
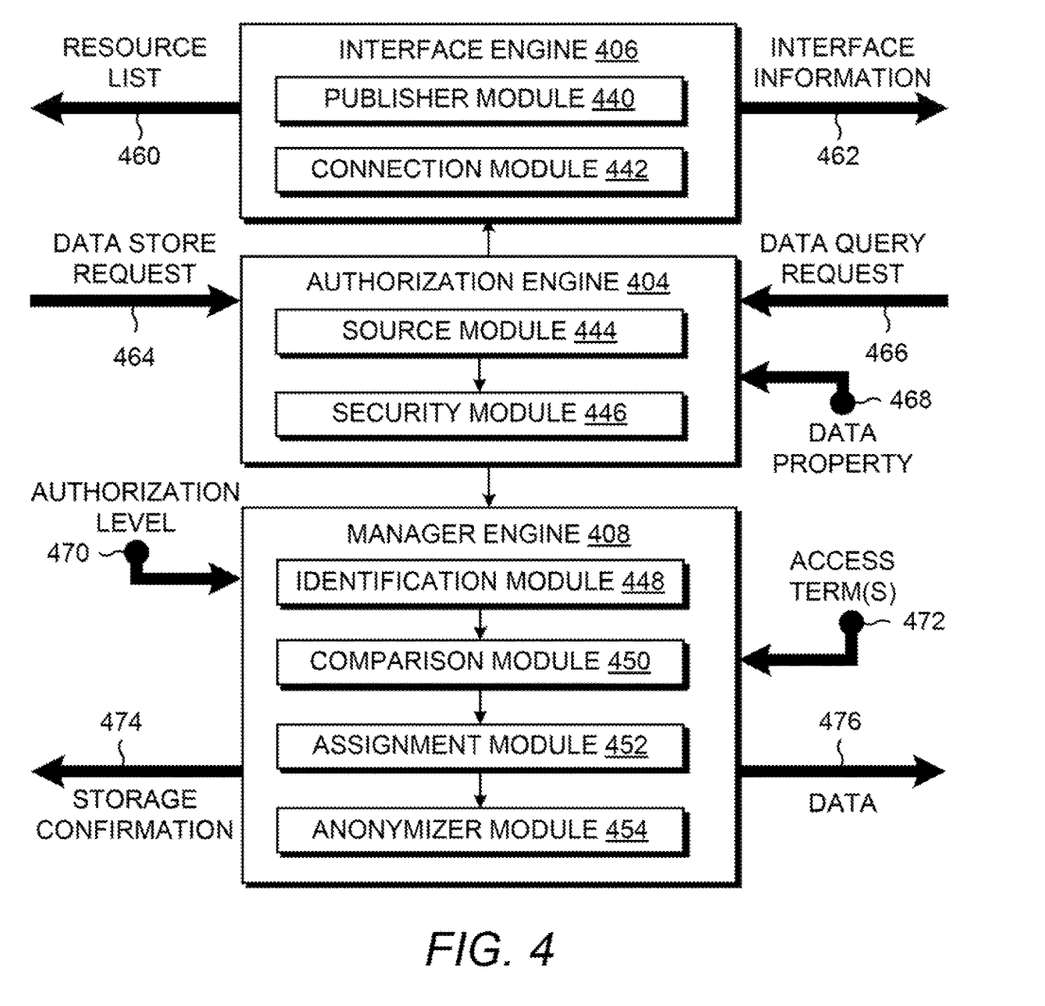
FIG. 4 depicts example modules used to implement example resource systems.
Figure 5:
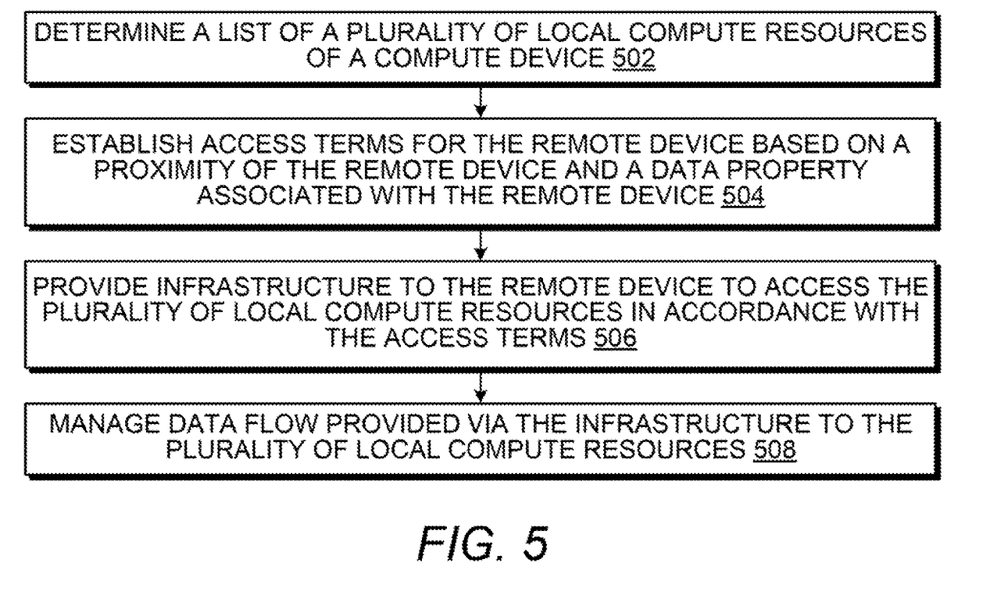
FIGS. 5 and 6 are flow diagrams depicting example methods for providing access to local compute resources.
Figure 6:
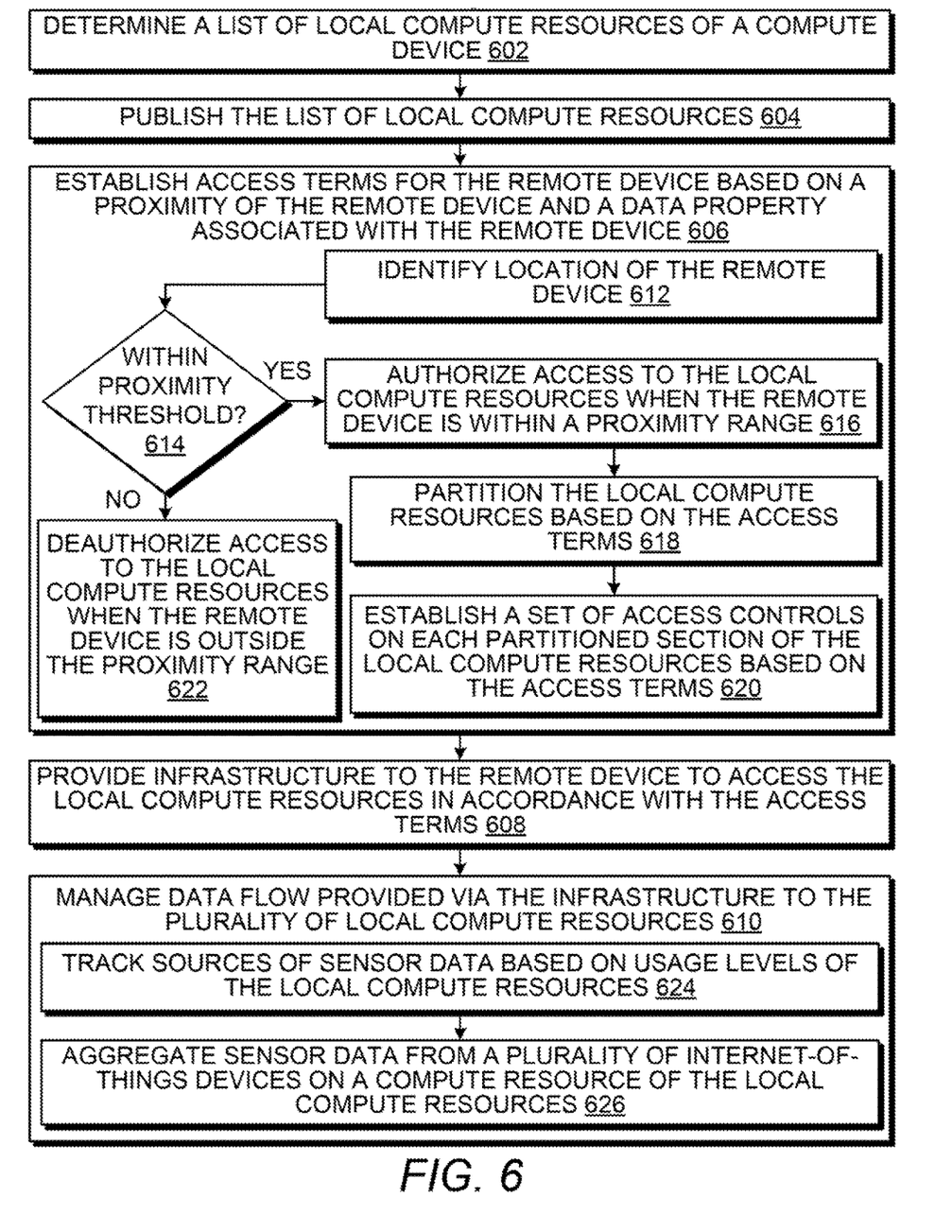

In some examples, functionalities described herein in relation to any of FIGS. 1-3 may be provided in combination with functionalities described herein in relation to any of FIGS. 4-6.

FIG. 2 depicts the example system 200 may comprise a memory resource 220 operatively coupled to a processor resource 222. Referring to FIG. 2, the memory resource 220 may contain a set of instructions that are executable by the processor resource 222. The set of instructions are operable to cause the processor resource 222 to perform operations of the system 200 when the set of instructions are executed by the processor resource 222. The set of instructions stored on the memory resource 220 may be represented as an authorization module 204, an interface module 206, and a manager module 208. The authorization module 204, the interface module 206, and the manager module 208 represent program instructions that when executed function as the authorization engine 104, the interface engine 106, and the manager engine 108 of FIG. 1, respectively. The processor resource 222 may carry out a set of instructions to execute the modules 204, 206, 208, and/or any other appropriate operations among and/or associated with the modules of the system 200. For example, the processor resource 222 may carry out a set of instructions to publish a list of local compute resources of a compute device and a list of data types compatible with the local compute resource to a device within a proximity range of the compute device. For another example, the processor resource 222 may carry out a set of instructions to, in response to a data store request, determine an authorization level of a data source, identify data from the data source to be stored at a local compute resource of a list of local compute resource, and assign a data property to the data. For yet another example, the processor resource 222 may carry out a set of instructions to, in response to a data query request, determine an authorization level of a data destination (i.e., a destination to receive the results of the data query request, such as a source of the request), identify a local compute resource based on the data query request, and assign access of the local compute resource to the data destination based on a comparison of the data property and an access term associated with the authorization level.

Although these particular modules and various other modules are illustrated and discussed in relation to FIG. 2 and other example implementations, other combinations or sub-combinations of modules may be included within other implementations. Said differently, although the modules illustrated in FIG. 2 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules. FIG. 4 depicts yet another example of how functionality may be organized into modules.

A processor resource, such as processor resource 222, is any appropriate circuitry capable of processing (e.g., computing) instructions, such as one or multiple processing elements capable of retrieving instructions from a memory resource, such as memory resource 220, and executing those instructions. For example, the processor resource 222 may be a CPU that enables providing access to a local compute resource by fetching, decoding, and executing modules 204, 206, and 208. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). The processor resource 222 may include multiple processing elements that are integrated in a single device or distributed across devices. The processor resource may process the instructions serially, concurrently, or in partial concurrence.

A memory resource, such as memory resource 220, represents a medium to store data utilized and/or produced by the system 200. The medium is any non-transitory medium or combination of non-transitory media able to electronically store data, such as modules of the system 200 and/or data used by the system 200. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. The memory resource 220 may be said to store program instructions that when executed by the processor resource 222 cause the processor resource 222 to implement functionality of the system 200 of FIG. 2. The memory resource 220 may be integrated in the same device as the processor resource 222 or it may be separate but accessible to that device and the processor resource 222. A memory resource may be distributed across devices.

In the discussion herein, the engines 104, 106, and 108 of FIG. 1 and the modules 204, 206, and 208 of FIG. 2 have been described as circuitry or a combination of circuitry and executable instructions. Such components may be implemented in a number of fashions. Looking at FIG. 2, the executable instructions may be processor-executable instructions, such as program instructions, stored on the memory resource 220, which is a tangible, non-transitory computer-readable storage medium, and the circuitry may be electronic circuitry, such as processor resource 222, for executing those instructions. The instructions residing on the memory resource 220 may comprise any set of instructions to be executed directly (such as machine code) or indirectly (such as a script) by the processor resource 222.

In some examples, the system 200 may include the executable instructions may be part of an installation package that when installed may be executed by the processor resource 222 to perform operations of the system 200, such as methods described with regards to FIGS. 4-6. In that example, the memory resource 220 may be a portable medium such as a compact disc, a digital video disc, a flash drive, or memory maintained by a computer device, such as a server, from which the installation package may be downloaded and installed. In another example, the executable instructions may be part of an application or applications already installed. The memory resource 220 may be a non-volatile memory resource such as read only memory (ROM), a volatile memory resource such as random access memory (RAM), a storage device, or a combination thereof. Example forms of a memory resource 220 include static RAM (SRAM), dynamic RAM (DRAM), electrically erasable programmable ROM (EEPROM), flash memory, or the like. The memory resource 220 may include integrated memory such as a hard drive (HD), a solid state drive (SSD), or an optical drive.

FIG. 3 depicts example environments in which various example resource systems may be implemented. The example environment 390 is shown to include an example resource system 300 for providing access to local compute resources. The system 300 (described herein with respect to FIGS. 1 and 2) may represent generally any circuitry or combination of circuitry and executable instructions to manage access to local compute resources. The system 300 may include an authorization engine 304, an interface engine 306, and a manager engine 308 that are the same as the authorization engine 104, the interface engine 106, and the manager engine 108 of FIG. 1, respectively, and the associated descriptions are not repeated for brevity. The engines 304, 306, and 308 may be integrated into a compute device, such as compute devices 330-340 discussed further below. The engines 304, 306, and 308 may be integrated via circuitry or as installed instructions into a memory resource of the compute device.

The resource system 300 of FIG. 3 is shown comprising resource components, such as a network interface 312, a processor resource 314, a control panel 316, an input device 318, and a data store 302. The resource components may be provided as usable local compute resources and/or may be used by the system 300 to perform operations associated with providing access to local compute resources. For example, the processor resource 314 may be allocated to devices 330 and 332 to perform computations related to location tracking. For another example, the control panel 316 may be requested by an IoT thermostat to be used as an external display to provide a user interface for the IoT thermostat, where such a user interface may allow both a user to send commands to the IoT thermostat and for the IoT thermostat to alert a user of the occurrence of an event and/or action recommendation. For yet another example, the network interface 312 may be used to connect to a compute device, such as compute devices 330-340, and bridge a capability from a first compute device to a second compute device via the resource system 300.

The data store 302 is a memory resource as discussed herein. The data store 302 may maintain a "pool" of raw sensor data (shown as raw data set 310 in FIG. 3) from sensors within proximity threshold of the resource system 300. For example, sensors, such as sensors included with compute devices 330-340, may be connected and authorized to store raw sensor data in data store 302 based on the sensors proximity to the resource system 300. The data store 302 may contain information utilized by the engines 104, 106, and 108 and/or local compute resources, such as resource components 312-318.

The resource system 300 may include a control panel 316 and an input device 318. The control panel 316 provides access to the data on the local compute resources of the resource system 300. The input device 318 converts information (e.g., physical information stored on paper media) into digital information stored on a local compute resource of the resource system 300. The control panel 316 and input device 318 may offer a way to manually enter data into and/or retrieve data from the data store 302, such as through assistance of an application. For example, the input device 318 may be a scanner to scan a list of items for a recipe or a receipt, that when added to the pool of raw sensor data may allow a refrigerator 334 to update a list of contents in the refrigerator 334. For another example, the input device 318 may be a biometric scanner that provides data of those in physical proximity of the biometric scanner.

The example environment 390 may include compute devices, such as IoT devices 330-340. The IoT devices represent generally any compute devices to communicate a network request and receive and/or process the corresponding responses. For example, a browser application may be installed on the user device 338 to receive the network packet from the resource system 300 and utilize the payload of the packet to display an element of a page via the browser application. In general, an IoT device refers to a physical object embedded with electronics, software, sensors, and/or connectivity (e.g., network connectivity or device-to-device connectivity) that enables the object to collect and exchange data. Example IoT devices include stationary devices (such as a connected thermostat 330, a refrigerator 334, a printer 336, etc.) and mobile devices (such as a notebook computer 338, a cell phone 340, a watch 332, etc.). An IoT device may include a device with a singular purpose, such as a temperature sensor, a motion detector, a door switch, etc. or multipurpose devices such as printers, wireless access points, thermostats, etc. An IoT device with a singular function may, by utilizing the example architecture and/or example methods of operations described herein, leverage the more complex device nearby that may have more local compute resources in comparison to the resources provided on the singular purpose device.

The compute devices may be located on separate networks or part of the same network. The proximity threshold may be determined based on the network of compute devices. Data and capabilities from the compute devices and/or the resource system 300 may be accessed by and/or provided to a cloud-based service, such as a cloud-based service offered on network 320. The example environment 390 may include any appropriate number of networks 320 and any number of the networks 320 may include a cloud compute environment. A cloud compute environment may include a virtual shared pool of compute resources. For example, networks 320 may be distributed networks comprising virtual computing resources. Any appropriate combination of the system 300 and compute devices may be a virtual instance of a resource of a virtual shared pool of resources. The engines and/or modules of the system 300 herein may reside and/or execute "on the cloud" (e.g., reside and/or execute on a virtual shared pool of resources). The data provided to the cloud-based service may be anonymized data (shown as anonymous data set 324 stored on a data store 322 of the cloud-based service).

An application 326 may request data and/or a service from the compute devices and may be offered access to the anonymous data set 324. The application 326 may request access to the raw data set 310, and may be provided requested data from the raw data set 310 when authorized by the authorization engine 304. For example, if the application 326 is being executed on a watch compute device 332 and the watch compute device 332 has a confirmed location within the proximity threshold (as identified by the authorization engine 304), then the interface engine 306 may provide the interface to access the raw data set 310 on the local compute resource (e.g., the data store 302) as determined by the access terms associated with the watch compute device 322 (as identified by the manager engine 308).

A link 328 generally represents one or a combination of a cable, wireless connection, fiber optic connection, or remote connections via a telecommunications link, an infrared link, a radio frequency link, or any other connectors of systems that provide electronic communication. The link 328 may include, at least in part, intranet, the Internet, or a combination of both. The link 328 may also include intermediate proxies, routers, switches, load balancers, and the like.

Referring to FIGS. 1-3, the engines 104, 106, and 108 of FIG. 1 and/or the modules 204, 206, and 208 of FIG. 2 may be integrated into a single device, such as a compute device comprising the resource components of the resource system 300, or distributed across devices, such as devices 330-340. The engine and/or modules may complete or assist completion of operations performed in describing another engine and/or module. For example, the manager engine 308 of FIG. 3 may request, complete, or perform the methods or operations described with the manager engine 108 of FIG. 1 as well as the authorization engine 104 and the interface engine 106 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. In some example, the engines of the system 300 may perform example methods described in connection with FIGS. 4-6.

FIG. 4 depicts example modules used to implement example resource systems. Referring to FIG. 4, the example modules of FIG. 4 generally include executable instructions to operate an authorization engine 404, an interface engine 406, and a manager engine 408 that are similar to the authorization engine 104, the interface engine 106, and the manager engine 108 of FIG. 1, and their respective descriptions are not repeated in their entirety. The example engines and modules of FIG. 4 may be implemented on a compute device, such as an office server, a home wireless router, or a printer.

Services may be offered by the system via the interface engine 406. The interface engine 406 may include program instructions, such as a publisher module 440 and a connection module 442, to facilitate offering services to a device within the proximity threshold. For example, the interface engine 406 may publish a list 406 of local compute resources available, data types, and/or interface information 462 to devices within a proximity threshold of the host compute device. The publisher module 440 represents program instructions that when executed by a processor resource cause the processor resource to publish information (e.g., the resource list 460, data types maintained on a local compute resource, information to access a PAAS container, etc.), such as, for example, by sending a broadcasted message to devices within a range of an antenna coupled to the host device. The connection module 442 represents program instructions that when executed by a processor resource cause the processor resource to provide interface information 462 to a device that requests access to a local compute resource, such as a service published via the publisher module 440. The interface information 462 may be a uniform resource locator (URL), infrastructure location, a connection method, a connection confirmation, or any other appropriate information to facilitate interfacing a host device with a destination, such as an IoT device or a cloud-based service application.

Requests to access local compute resources may be received by the authorization engine 404 of the system. For example, a data store request 464 (to store data on a local compute resource) and/or a data query request 466 (to retrieve data from a local compute resource) may be received by the authorization engine 404. The authorization engine 404 may include program instructions, such as a source module 444 and a security module 446, to facilitate determining an authorization level of a resource request (e.g., the authorization level of the source of data of a data storage request or the authorization level of the destination of the data of a data query request) and/or assigning a data property to an access request. The source module 444 represents program instructions that when executed by a processor resource cause the processor resource to identify the source of the access request. The security module 446 represents program instructions that when executed by a processor resource cause the processor resource to assign a data property 468 to the access request based on the context of the request. For example, a device making a request may have limited authorization (such as a time limit) to access the pool of sensor data and the data property is an identifier that represents the access limitation. For another example, the application requesting access to the data pool may have authorization to provide data to the pool but not retrieve data and that limitation is represented by a data property associated with the access request and/or the source of the request. For yet another example, the authorization engine 404 may identify data of the data store request 464 to be stored at the local compute resource and the identified data may be associated with the data property 468 to limit retrieval by compute devices.

The manager engine 408 may include program instructions (e.g., an identification module 448, a comparison module 450, an assignment module 452, and an anonymizer module 454) to facilitate management of the local compute resources. For example, the manager engine 408 may invoke program instructions to identify a local compute resource based on a resource request, determine an authorization level 470 of the resource request, and assign access rights to the resource request based on a comparison of the data property of the local compute resource and an access term associated with the authorization level. An authorization level is associated with a degree of permissions to access the local compute resources and may be determined based on the type of request, the source of the request, the destination of the request, the expected results of the request, the proximity threshold, access terms of agreements for services offerable by the host device, and/or other security factors.

The identification module 448 represents program instructions that when executed by a processor resource cause the processor resource to identify data of the resource request (e.g., the data from the data source to be stored at a local compute resource or the location of the data to be retrieved). For example, a first compute device may request sensor data from a second compute device and the location of the compute resource and/or the location of the portion of the compute resource (e.g., the address of the memory block allocated to the second compute device) may be retrieved when executing the identification module 448.

The comparison module 450 represents program instructions that when executed by a processor resource cause the processor resource to compare a data property (e.g., a data property associated with the resource request or a data property associated with the local compute resource of data) and an access term 472 associated with an authorization level. For example, the resource request (e.g., 464 or 466) may be associated with a data property 468 and the source of the resource request is associated with an authorization level based on an access term (or terms), the data property 468 is compared to the permissions associated with the authorization level, and if the data property 468 satisfies (e.g., is within the permitted operations) then the manager engine 408 allows the resource request to be performed.

The assignment module 452 represents program instructions that when executed by a processor resource cause the processor resource to assign a data property and/or assign access rights. The data property and/or access rights are assigned based on access term(s) 472 associated with the permissions authorized by the source (e.g., based on a service level agreement).

The anonymizer module 454 represents program instructions that when executed by a processor resource cause the processor resource to provide anonymous data to a destination. For example, execution of the anonymizer module 454 may retrieve anonymous data in lieu of raw sensor data when the authorization level does not satisfy the access term 472 or may convert the raw sensor data to an anonymized version prior to sending the data to the destination.

In response to execution of the manager engine 408, a message may be sent in response to a resource request received by the system. For example, a storage confirmation 474 may be sent to a source of the data store request 464. For another example, a communication including the retrieved data 476 provided from the local storage may be sent to a source of the data query request 466.

FIGS. 5 and 6 are flow diagrams depicting example methods for providing access to local compute resources. Referring to FIG. 5, example methods for providing access to local compute resources may generally comprise determining a list of a plurality of local compute resources, establishing access terms for a remote device, providing an infrastructure to the remote device to access the local compute resources in accordance with the access terms, and managing data flow provided via the infrastructure to the plurality of local compute devices. The operations discussed with respect to FIG. 5 are performable by the system comprising an authorization engine, an interface engine, and a manager engine, such as system 100 of FIG. 1.

At block 502, a list of a plurality of local compute resources of a compute device are determined. For example, an interface engine may identify the compute devices connected to the host device. The compute device determines the local compute resources that are available to lease to a remote device and compiles a list of the available local compute resources to provide to the remote device. For example, the resource components and services available that have not been completely leased may be identified by the host device and the resource components and services that are identified as available may be broadcasted to devices within a proximity threshold of the host device (e.g., via a personal area network broadcast).

At block 504, access terms for the remote device are established based on a proximity of the remote device and a security property associated with the remote device. For example, a manager engine, such as manager engine 108, may identify permissions authorized to be performed by an application that allow storage and retrieval from a local storage compute resource and associate a security property that represents the level of access with the remote device. For another example, the remote device may revoke all access permission when the remote device goes beyond the proximity threshold. In this manner, devices associable with the network within the proximity threshold may, for example, access the local compute sources according to dynamic and adaptive security protocols.

At block 506, an infrastructure is provided to the remote device. For example, an interface engine, such as interface engine 106 of FIG. 1, may provide the infrastructure identified by the manager engine to a destination of the resource request. The infrastructure provided at block 506 provides access to the plurality of local compute resources in accordance with the access terms. For example, a personal area network pairing with limitations made by the access terms may be initiated and allow access to the local compute resource associated with the resource request. For another example, a PAAS container may be provided with the access terms implemented as providing or not providing particular infrastructure to enable capabilities associated with the access terms.

At block 508, data flow provided via the infrastructure to the plurality of local compute resources is managed by the compute device. For example, data retrieval requests and data storage requests are managed by the compute device, such as via a manager engine, to determine allocation of access to the plurality of local compute resources. The compute device accounts for authorization level of the requests (e.g., access terms agreed to by the source of the request) and the type of request (e.g., the type of resource being requested, the amount of the resource being requested) when determining how to allocate resources and otherwise perform the operations of the resource request.

A host device performing the operations discussed with respect to FIG. 5 may manage a pool of compute resources and offer them to nearby devices (e.g., devices within a proximity threshold) in accordance with agreements to provide the services. In this manner, the host device may manage leasing of the local compute devices to an IoT device by managing access in accordance with access terms associated with a lease agreement and by proximity to the host device. One example benefit of hosting local compute resources allows for raw data (e.g., non-anonymous data) to be accessible by devices to produce a smart local environment that is able to exchange information between trusted devices without exposing private data (e.g., non-anonymous data) to access from third parties beyond the proximity threshold.

FIG. 6 includes blocks similar to blocks of FIG. 5 and provides additional blocks and details. In particular, FIG. 6 depicts additional blocks and details generally regarding publishing the list of local compute resources, identifying the location of the remote device, authorization and deauthorization, tracking sources and usage levels of the compute resources, and aggregating sensor data. Blocks 602, 606, 608, and 610 are the similar to blocks 502, 504, 506, and 508 of FIG. 5 and, for brevity, their respective descriptions are not repeated in their entirety.

At block 604, the list of local compute resources determined (e.g., identified as available) at block 602 are published. The list of compute resources may be published passively (e.g., to a web page or a public interface destination) or actively (e.g., send communication to a maintained list of devices in a network). For example, the list of local compute resources may be published by sending scheduled broadcasts to devices within wireless range of the host device. For another example, a device may receive the list of local compute resources in response establishing a connection to an office network.

At block 606, authorization of a request is established by identifying the proximity of the remote device at block 612 and setting up (or denying) the access in accordance with the authorization of the request. At block 614, the location of the device identified at block 612 is compared to the proximity threshold. If the remote device is outside the proximity range of the host device, access to the local compute resources is deauthorized at block 622. If the remote device is within the proximity range, access to the local compute resources is authorized at block 616.

The local compute resources may be partitioned based on access terms at block 618. For example, if a resource request requires dedicated storage, then a memory resource may be divided into leasable parts and allocate the number of parts in accordance with the access terms. A set of access controls on each partitioned section of the plurality of local compute resources are established based on the access terms at block 620. Example access controls include maintaining a list of media address control (MAC) addresses, credential matching, encryption, the like, or a combination thereof.

At block 610, the data flow managed by the host device may be based on usage levels, priorities for terms of access, and/or whether the data is to be kept raw or anonymously. At block 624, the sources of sensor data are tracked based on usage levels of the local compute resources. For example, the requests made by a particular source may be tracked against a maximum usage term agreed to by the source. For another example, a request may be associated with a higher priority and may be placed for immediate access to a local storage compute resource and another request may be denied based on a lower priority associated with the other request.

Sensor data from a plurality of IoT devices are aggregated on a local compute resource at block 626. For example, a local memory resource of a plurality of local storage compute resources may be dedicated to a pool of raw data from sensors on IoT devices within a proximity threshold of the host device (e.g., all devices within the proximity range are allowed to place their sensor readings into the memory resource and authorized devices are able to access the dedicated local compute resource based on the access controls at block 620. In this manner, local compute resources of a host device are managed to allow access by IoT devices within a proximity threshold and based on access terms associated with agreements for access. For example, IoT devices that may not include a type of compute resource, may not include a sufficient amount of a compute resource to perform an operation, or may utilize additional compute resources to, for example, improve performance of the IoT device and/or cloud-based services associated with the IoT device.

Although the flow diagrams of FIGS. 4-6 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

All of the features disclosed in this specification (including any accompanying claims, abstract and drawings), and/or all of the elements of any method or process so disclosed, may be combined in any combination, except combinations where at least some of such features and/or elements are mutually exclusive.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A system comprising:
a processor managing access to a local compute resource; and
a memory storing computer readable instructions executable by the processor to:
authorize a resource request to the local compute resource from a source;
assign a data property to the local compute resource in response to a determination the resource request is authorized to access the local compute resource, wherein the data property assigned to the local compute resource identifies a classification for the local compute resource;
determine an authorization level of the resource request;
determine whether the data property assigned to the local compute resource is within permitted operations based on a comparison of the data property assigned to the local compute resource and an access term associated with the authorization level; and
assign access of the local compute resource to the resource request based on determining that the data property assigned to the local compute resource is within the permitted operations, wherein the assigning access of the local compute resource to the resource request includes prioritizing demand of the local compute resource based on a level of demand and the access term.

2. The system of claim 1, wherein the computer readable instructions which, when executed by the processor, cause the processor to:
broadcast a list of local compute resources to devices within a proximity range; and
broadcast a data type compatible with the local compute resource.

3. The system of claim 1, wherein the data property assigned to the local compute resource specifies:
a class of devices for access to data of the local compute resource; and a class of requests for access to the data of the local compute resource.

4. The system of claim 1, wherein the computer readable instructions which, when executed by the processor, cause the processor to:
assign data of the local compute resource for remote access in response to a determination the data of the local compute resource is publishable based on a user preference; and
publish a portion of the data of the local compute resource to a remote compute resource, wherein the portion of the data of the local compute resource is identified based on the data property assigned to the local compute resource and the user preference.

5. The system of claim 1, wherein the computer readable instructions which, when executed by the processor, cause the processor to:
monitor access to the local compute resource.

6. The system of claim 1, wherein the computer readable instructions which, when executed by the processor, cause the processor to:
provide an interface to provide bridge capabilities of a first device to a second device; and
broadcast the bridge capabilities of the first device and the local compute resource to devices within a proximity range as a platform as a service (PAAS) infrastructure.

7. The system of claim 1, further comprising:
a control panel to provide access to data on the local compute resource; and
an input device to convert physical information stored on a media into digital information stored on the local compute resource.

8. The system of claim 7, wherein the system further comprises a multi-function print device and wherein the input device is a scanner.

9. The system of claim 1, wherein the computer readable instructions which, when executed by the processor, cause the processor to:
provide anonymous data in response to the resource request if the authorization level does not satisfy the access term.

10. A non-transitory computer-readable storage medium comprising a set of instructions executable by a processor resource to:
publish a list of local compute resources of a compute device to a device within a proximity range of the compute device;
in response to a data store request:
determine an authorization level of a data source;
identify data from the data source to be stored at a first local compute resource of the list of the local compute resources; and
assign a data property to the data, wherein the data property assigned to the data identifies a classification; and
in response to a data query request:
determine an authorization level of a data destination;
identify the first local compute resource based on the data query request;
determine whether the data property assigned to the data is within permitted operations based on a comparison of the data property assigned to the data and an access term associated with the authorization level; and
assign access of the first local compute resource to the data destination based on determining that the data property assigned to the data is within the permitted operations, wherein the assigning access of the first local compute resource to the data destination includes prioritizing access requests to the first local compute resource based on a demand level identified by monitored access requests and access terms associated with the monitored access requests.

11. The medium of claim 10, wherein the set of instructions is executable by the processor resource to:
establish access terms to the first local compute resource for an Internet-of-Things (IoT) device;
establish a resource stack of a platform as a service (PAAS) infrastructure model based on the access terms;
maintain raw sensor data of the IoT device on the first local compute resource in accordance with the access terms; and
send anonymized sensor data to a remote memory location in accordance with the access terms.

12. The medium of claim 10, wherein the data property assigned to the data specifies:
a class of devices for access to data of the first local compute resource; and
a class of requests for access to the data of the first local compute resource.

13. The medium of claim 10, wherein the set of instructions is executable by the processor resource to:
provide anonymous data in response to the data query request if the authorization level does not satisfy the access term.

14. A method of providing access to local compute resources comprising:
determining, via a compute device, a list of a plurality of local compute resources of the compute device available to lease to a remote device;
assigning a data property to each of the local compute resources, wherein the data property assigned to each of the local compute resources identifies a classification for a respective local compute resource;
establishing access terms for the remote device based on a proximity of the remote device to the compute device and a security property associated with the remote device;
providing an infrastructure to the remote device to access the plurality of local compute resources in accordance with the data property assigned to each of the local compute resources and the access terms in case the data property assigned to each of the local compute resources is within permitted operations, wherein the access to the plurality of local compute resources is prioritized based on a level of demand and the access terms; and
managing, by the compute device, data flow provided via the infrastructure to the plurality of local compute resources.

15. The method of claim 14, further comprising:
authorizing access to the plurality of local compute resources when the remote device is within a proximity range; and
deauthorizing access to the plurality of local compute resources when the remote device is outside the proximity range.

16. The method of claim 14, further comprising:
partitioning the plurality of local compute resources based on the access terms; and
establishing a set of access controls on each partitioned section of the plurality of local compute resources based on the access terms.

17. The method of claim 14, further comprising:

tracking sources of first sensor data based on usage levels of the plurality of local compute resources; and aggregating second sensor data from a plurality of Internet-of-Things (IoT) devices on a first compute resource of the plurality of local compute resources.

18. The method of claim 14, further comprising:

broadcasting a data type compatible with a local compute resource of the list of the plurality of local compute resources.

19. The method of claim 14, wherein the security property associated with the remote device specifies:

a class of devices for access to data of a local compute resource of the list of the plurality of local compute resources; and a class of requests for access to the data of the local compute resource.

20. The method of claim 14, wherein the managing the data flow provided by the infrastructure includes providing anonymous data in response to a data query request from the remote device if an authorization level does not satisfy an access term of the access terms.

* * * * *